Patented Aug. 6, 1935

2,010,548

UNITED STATES PATENT OFFICE 2,010,548

CONCENTRATION OF DILUTE ACETIC ACID OR LIQUOR CONTAINING SAME

Herbert Langwell, Windmill End, Epsom, and Robert Gilmour, London, England, assignors to Standard Brands Incorporated, New York, N. Y., a corporation of Delaware No Drawing. Application May 6, 1932, Serial No. 609,762. In Great Britain May 12, 1931

8 Claims. (Cl. 260—122)

This invention relates to the concentration of dilute acetic acid or liquor containing same such as vinegar.

Several methods are known and used for the industrial concentration of dilute acetic acid as for example by distillation, by solvent extraction in the liquid or vapour phase, and by applying azeotropic principles. Such known methods require a considerable amount of heat and present corrosion difficulties, and in addition when applied to vinegar affect its flavour on account of the high temperature employed.

It is also known that by cooling dilute acetic acid and removing the ice that is formed a more concentrated acetic acid is left behind as mother liquor. Such a process avoids the disadvantages of high temperature and lessens corrosion troubles but its industrial development has not been possible owing to difficulties which the present invention obviates.

It is an object of the invention to provide a process for the concentration of acetic acid by removing water therefrom by freezing in which the disadvantages present in prior procedures are largely obviated and which procedure may be readily, effectively and economically carried out in plant operations.

A more specific object of the invention is to provide a process for removing a part of the water content of vinegar in a manner such that the desirable qualities of the vinegar will be conserved and when diluted will retain the flavor and bouquet of the original vinegar.

Other objects of the invention will in part be obvious and will in part appear hereinafter.

An important feature of the present invention resides in passing the acid cooled to a temperature near its freezing point through a heat interchanger at a speed of travel such that the ice cannot accumulate on the cooling surfaces but remains as crystals freely floating in the liquid. Such crystals are then separated in any suitable manner before the liquid has begun to move sluggishly owing to accumulation of ice.

A further feature of the invention consists in washing the separated ice crystal mass with further quantities of the preliminary cooled dilute acid liquid to be concentrated. The ice crystal mass so washed still retains some acid and, instead of recovering this by washing with water, another feature of the present invention consists in mixing it with alcohol or alcoholic liquid to such an extent as to effect a lowering of the temperature and a partial liquefaction to a condition in which the mixture can be used as cooling medium for pre-cooling the acid before it passes to the aforesaid heat interchanger.

In the case of vinegar manufacture where it is customary to return a portion of the final product to the plant and to add water and denatured alcohol to the returned portion as it returns, the above-mentioned partially liquefied ice-alcohol mixture after serving as a pre-cooling medium for the acid may be usefully employed by adding it to the returned vinegar; by so doing the addition of an equivalent amount of external water to the vinegar cycle can be avoided and the retained acid in the ice-alcohol mixture is not lost.

In order that the carrying out of the invention may be clearly understood consider for example the concentration of ten per cent. vinegar obtained from a vinegar plant up to say forty per cent. strength. A portion of the product leaving such a plant is usually returned to the plant, the remainder only (containing about 10 per cent. acetic acid) being withdrawn.

According to the specific procedure now about to be described the withdrawn vinegar is given a preliminary cooling to say —2° C. by any known means such as the use of the alcohol-ice mixture above referred to and is then concentrated in accordance with the present invention by passing first through one or more heat exchangers where the conditions are such that free ice crystals are formed and then through an ice separating vessel or compartment where the ice crystals are removed from the now concentrated vinegar.

The conditions of cooling maintained in the heat exchanger or exchangers is of particular importance because it is there that the ice crystals are formed as free particles in the body of the vinegar.

If the cooling (e. g. by means of brine or carbon dioxide or otherwise) were too rapid the ice would form on the cooling surfaces and cause the exchanger to cease to function efficiently. On the other hand too slow a rate of cooling would lead to reduced output although the cooling surfaces would remain free from ice-coating. The maximum output is therefore determined by a rate of cooling that just avoids the formation of a coating of ice on the cooling surfaces. The vinegar while being cooled must of course be moving over the cooling surfaces, and we have found that a speed of travel suitable in practice is of the order of three feet per second and that at such speed the temperature difference between the vinegar and the cooling medium should be such that the heat transmission is of the order of 500 to 1000 kg. calories per hour, per square metre of cooling surface.

In order to reduce to some extent the rate of heat transmission through the cooling surfaces they may be coated if desired with material of low conductivity such as rubber, enamel, etc.

The total cooling may be effected in one heat exchanger or in several in series. For example a first cooling may be effected to about —5° C. yielding a vinegar of about 16% strength and be followed by a second cooling to about —15° C.

yielding a vinegar of about 40 per cent. strength. This withdrawn vinegar will be found to have conserved all the desirable qualities of the original vinegar and when diluted to a suitable degree cannot be distinguished in flavour and bouquet from the untreated vinegar.

On leaving the heat exchanger or each of the two or more such exchangers, the ice-crystal laden vinegar is passed through any convenient form of ice-crystal separator, in which the ice crystals are washed with some of the preliminarily cooled dilute vinegar, which is then passed through the heat exchangers as already described. The washed crystals together with any naturally retained vinegar are then mixed with cold denatured alcohol to form a low temperature partially liquefied mass which is used as cooling medium for pre-cooling the vinegar before it passes to the heat exchanger or exchangers where the actual formation of the ice crystals takes place. The amount of denatured alcohol so used may be such that the mixture of it with the ice crystals is of about 9 per cent. strength. After being thus utilized for pre-cooling as above stated this mixture may be added to the recirculated portion of the vinegar returning to the vinegar plant, being thus usefully employed in place of the water and alcohol usually added to such returned portion.

What we claim is:—

1. A method of concentrating an acetic acid containing liquid which comprises causing it to travel through a heat interchanger at a predetermined speed, cooling it in transit by indirect contact with a heat interchange medium to a temperature at which freely floating ice crystals are formed in the travelling liquid, the speed and cooling being correlated to obviate the deposition of ice upon the walls of the heat exchanger, and separating said ice crystals from the concentrated acid.

2. A method of concentrating an acetic acid containing liquid which comprises causing it to travel through a heat interchanger at a predetermined speed, cooling it in transit by indirect contact with a heat interchange medium to a temperature at which freely floating ice crystals are formed in the travelling liquid, the speed and cooling being correlated to obviate the deposition of ice upon the walls of the heat exchanger, separating said ice crystals from the concentrated acid, and washing the separated ice crystal mass with some of the acid to be concentrated.

3. A method for the production of acetic acid by fermentation including in combination a concentration process, which comprises subjecting the produced acetic acid to a preliminary cooling then causing it to travel through a heat interchanger at a predetermined speed, cooling it in transit by indirect contact with a heat interchange medium to a temperature at which freely floating ice crystals are formed in the travelling liquid, separating said ice crystals from the concentrated acid, washing the separated ice crystal mass with some of the pre-cooled acetic acid containing liquid, mixing the washed crystals with their retained acid with alcoholic liquid to produce a low temperature partially liquefied mass, utilizing said mass as pre-cooling medium for the aforesaid precooling and then returning the mass to the acetic acid fermentation process as water and alcohol mixture used therein.

4. A method of concentrating an acetic acid containing liquid which comprises subjecting said liquid containing about 10% acetic acid to a preliminary cooling, then causing it to travel through a heat interchanger at a speed of the order of three feet per second in indirect contact with a heat exchange medium such that the temperature difference between the acid liquid to be concentrated and the cooling medium causes heat transmission of the order of from 500 to 1000 kg. calories per hour per square metre of cooling surface, whereby the deposition of ice upon the walls of the heat exchanger is obviated, and then separating the freely floating ice crystals formed in the liquid from the remaining concentrated acid.

5. A method for the production of vinegar including in combination a concentration process which comprises preliminarily cooling the produced vinegar, causing it to travel through a heat interchanger at a predetermined speed, cooling it in transit by indirect contact with a heat exchange medium to a temperature at which freely floating ice crystals are formed in the travelling liquid, separating said ice crystals from the concentrated vinegar, mixing the ice crystals with their retained vinegar with denatured alcohol to produce a low temperature partially liquefied mass, utilizing said mass as cooling medium for the aforesaid preliminary cooling, and then returning it to the vinegar process in place of the usually employed external water and denatured alcohol.

6. A method for the production of vinegar including in combination a concentration process which comprises preliminarily cooling the produced vinegar, causing it to travel through a heat interchanger at a predetermined speed, cooling it in transit by indirect contact with a heat exchange medium to a temperature at which freely floating ice crystals are formed in the travelling liquid, separating said ice crystals from the concentrated vinegar, washing them with some of the vinegar to be concentrated, mixing the ice crystals with their retained vinegar with denatured alcohol to produce a low temperature partially liquefied mass, utilizing said mass as cooling medium for the aforesaid preliminary cooling, and then returning it to the vinegar process in place of the usually employed external water and denatured alcohol.

7. A method of concentrating an acetic acid containing liquid, which comprises cooling said liquid to about its freezing point and causing the cooled liquid to travel through a heat interchanger at a rate of travel such that ice crystals are formed in the liquid and remain freely floating therein, the rate of travel and the cooling being correlated to obviate the deposition of ice upon the walls of the heat exchanger.

8. A method of concentrating an acetic acid containing liquid, which comprises passing said liquid containing about 10% acetic acid through a heat interchanger at a rate of travel of about three feet per second in indirect heat exchange relation with a cooling medium such that the temperature difference between the acid liquid and the cooling medium occasions a heat transmission of the order of about 500 to 1000 kg. calories per hour per square meter of cooling surface, whereby the deposition of ice upon the walls of the heat exchanger is obviated.

HERBERT LANGWELL.
ROBERT GILMOUR.